(12) United States Patent
Hallonet

(10) Patent No.: US 10,780,870 B2
(45) Date of Patent: Sep. 22, 2020

(54) RAILWAY VEHICLE COMPRISING AN EMERGENCY BRAKING DEVICE

(71) Applicant: ALSTOM Transport Technologies, Saint-Ouen (FR)

(72) Inventor: Frederic Hallonet, Jarne (FR)

(73) Assignee: Alstom Transport Technologies, Saint-Ouen (FR)

( * ) Notice: Subject to any disclaimer, the term of this patent is extended or adjusted under 35 U.S.C. 154(b) by 0 days.

(21) Appl. No.: 16/203,441

(22) Filed: Nov. 28, 2018

(65) Prior Publication Data

US 2019/0168729 A1 Jun. 6, 2019

(30) Foreign Application Priority Data

Dec. 5, 2017 (FR) ..................................... 17 61639

(51) Int. Cl.
| | |
|---|---|
| *B60T 1/14* | (2006.01) |
| *B60T 13/66* | (2006.01) |
| *B60T 17/22* | (2006.01) |
| *B61H 7/06* | (2006.01) |
| *B60T 7/12* | (2006.01) |
| *B60T 8/32* | (2006.01) |

(52) U.S. Cl.
CPC .............. *B60T 13/665* (2013.01); *B60T 1/14* (2013.01); *B60T 7/124* (2013.01); *B60T 17/228* (2013.01); *B61H 7/06* (2013.01); *B60T 8/321* (2013.01)

(58) Field of Classification Search
CPC .................................... B60T 1/14; B61H 7/04
See application file for complete search history.

(56) References Cited

U.S. PATENT DOCUMENTS

| | | | | |
|---|---|---|---|---|
| 3,730,300 | A | * 5/1973 | Scherenberg | ............. B60T 1/14 188/5 |
| 2005/0001479 | A1 | * 1/2005 | Watanabe | ................. B60T 1/14 303/139 |

(Continued)

FOREIGN PATENT DOCUMENTS

| | | |
|---|---|---|
| CN | 2280032 Y | 4/1998 |
| CN | 203727347 U | 7/2014 |

(Continued)

OTHER PUBLICATIONS

French Patent Application No. 1761639, INPI Rapport de Recherche Préliminaire, dated Aug. 22, 2018, 2 pages.

(Continued)

*Primary Examiner* — Nicholas J Lane
(74) *Attorney, Agent, or Firm* — Soquel Group LLC

(57) ABSTRACT

A railway vehicle, including an emergency braking device including at least one brake module, wherein each module includes a contact element intended to be in contact with the ground at the moment of braking, and movable between a retracted position and a deployed position in which the contact element is in contact with the ground and is able to slow down the moving railway vehicle by applying a pressure force to the ground, and at least one control unit that is capable of communicating commands to the brake module, wherein the control unit is able to communicate to the brake module the command to deploy the contact element to its deployed position when at least a portion of the vehicle leaves the track on which the vehicle is traveling.

15 Claims, 2 Drawing Sheets

(56) References Cited

U.S. PATENT DOCUMENTS

| | | | | |
|---|---|---|---|---|
| 2011/0198161 A1* | 8/2011 | Lomazzo | ................. | B60T 1/14 |
| | | | | 188/5 |
| 2015/0158507 A1* | 6/2015 | Flamanc | ................. | B60T 7/124 |
| | | | | 104/242 |
| 2001/6347332 | 12/2016 | Moynihan | | |

FOREIGN PATENT DOCUMENTS

| | | | | | |
|---|---|---|---|---|---|
| EP | 2586668 | A2 | | 5/2013 | |
| FR | 2245514 | A1 | | 4/1975 | |
| FR | 2917361 | A1 | | 12/2008 | |
| GB | 176041 | A | | 2/1922 | |
| GB | 1104985 | A | * | 3/1968 | ............... B61H 9/02 |
| GB | 2517350 | A | | 2/2015 | |
| JP | 2006282095 | A | | 10/2006 | |
| WO | WO-2014049485 | A1 | * | 4/2014 | ............... B60T 1/14 |

OTHER PUBLICATIONS

French Patent Application No. 1761639, INPI Opinion Écrite Sur La Brevetabilité de L'Invention, dated May 12, 2017, 4 pages.

* cited by examiner

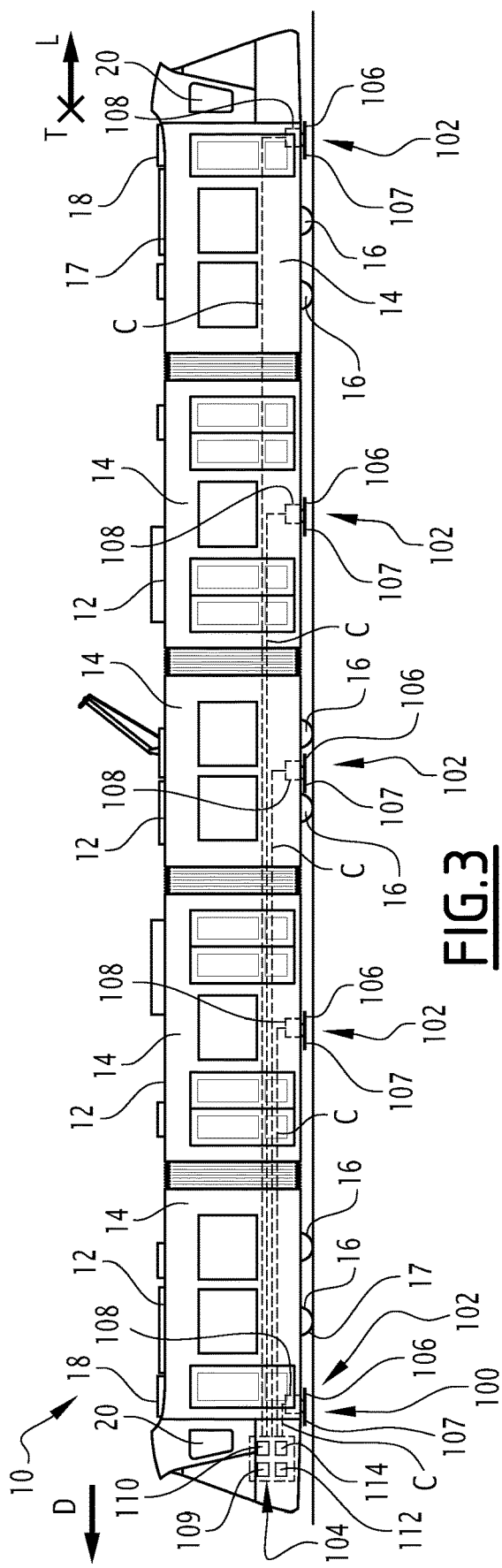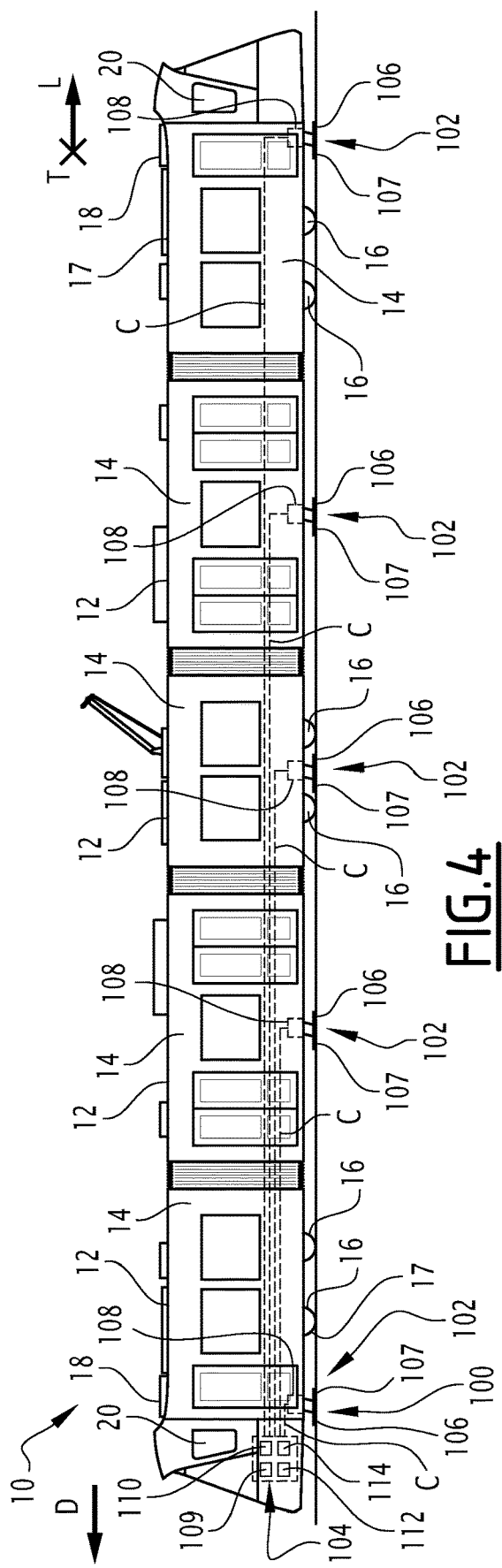

RAILWAY VEHICLE COMPRISING AN EMERGENCY BRAKING DEVICE

CROSS-REFERENCE TO RELATED APPLICATIONS

This application claims priority of French Patent Application No. 17 61639, filed on Dec. 5, 2017.

FIELD OF THE INVENTION

The present invention relates to a railway vehicle comprising at least one body, wherein the vehicle is intended to travel on a railway track, and wherein the vehicle comprises an emergency braking device.

BACKGROUND OF THE INVENTION

Railway vehicles, in particular trams, are equipped with different emergency braking systems. Generally, the braking systems employed are mechanical, electrodynamic, hydrodynamic or magnetic systems.

When braking a railway vehicle, the braking force results mainly from the adhesion between the wheels of the vehicle and the rails forming the track on which the vehicle is traveling.

An emergency stop device is, for example, described in WO2014/049485.

This device comprises brake plates that are intended to come into contact with the outside of the rail on which the railway vehicle is traveling in order to slow down the vehicle. However, this device is not suitable in the event of the railway vehicle leaving the track on which it is traveling, since it requires contact between the brake plates and the rails.

Due to a very low coefficient of friction between the steel wheels and the ground, derailed vehicles, i.e., those that have left the rails, may become very dangerous and may not be stopped by emergency braking systems that are intended to stop vehicles while on the rails. Significant damage may occur as it moves in an uncontrolled manner.

In addition, known emergency braking devices may cause sudden braking, that is most often unpleasant for the passengers.

SUMMARY OF THE DESCRIPTION

One of the aims of the invention is to overcome the drawbacks described above.

For this purpose, the object of the invention is a railway vehicle comprising at least one body, wherein the vehicle is intended to run on a railway track, and wherein the vehicle comprises an emergency braking device comprising:
  at least one brake module, wherein each module comprises a contact element intended to come into contact with the ground at the moment of braking, wherein the contact element may be moved between a retracted position in which the contact element is not in contact with the ground, and a deployed position in which the contact element is in contact with the ground, and is capable of slowing down the moving railway vehicle by applying a pressure force to the ground, and
  at least one control unit that is capable of communicating commands to the brake module,
wherein the control unit is able to communicate to the brake module the command to deploy the contact element of the brake module to its deployed position, when at least a portion of the vehicle leaves the track on which the vehicle is traveling.

Such an emergency braking device makes it possible to compensate for the lack of adhesion between the wheels of the vehicle and the ground covering when the vehicle leaves the track on which it is traveling, and thus material damage and human injury as a result of such a lack of adhesion, may be avoided.

The distance of travel after derailment of a railway vehicle comprising such an emergency braking device is thus controlled and limited.

The railway vehicle according to the invention may comprise one or more of the following characteristics, taken alone or in any technically feasible combination:
  the vehicle extends in a longitudinal direction, the control unit comprises a sensor for measuring longitudinal acceleration of the vehicle and a calculator of the derivative of the longitudinal acceleration, wherein the control unit is able to control the pressure force on the ground of the brake module at acceleration and the derivative of the acceleration in the longitudinal direction;
  the brake module comprises an actuator that is designed to deploy the contact element from the retracted position to the deployed position in a controlled manner by the control unit;
  the contact element of the brake module is an airbag and the actuator is a pyrotechnic system comprising charges;
  the contact element of the brake module is a contact pad, while the actuator is a device connecting the mechanical pad to the railway vehicle body;
  the control unit further comprises a sensor measuring the transverse acceleration of the vehicle, that is designed to detect a shock between the railway vehicle and an element outside the vehicle; and
  the vehicle comprises a plurality of cars, wherein each car comprises at least one brake module, and wherein the control unit is arranged to deploy each contact element from the retracted position to the deployed position so that the pressure force on the ground of each brake module decreases from the rear of the vehicle towards the front of the vehicle.

The invention also relates to an emergency braking method for a railway vehicle after the vehicle leaves the track, wherein the method comprises the following steps:
  provision of the emergency braking device according to the invention;
  detection of at least a portion of the railway vehicle leaving the track;
  activation of the control unit;
  activation of the brake module by the control unit;
  deployment of the contact element of the brake module from the retracted position to the deployed position so that the contact element comes into contact with the ground; and
  braking of the railway vehicle.

According to particular embodiments of the invention, the method according to the invention may comprise one or more of the following characteristics, taken alone or in any technically feasible combination:
  the vehicle comprises a plurality of cars wherein each comprises at least one brake module, and wherein the pressure force on the ground decreases from the rear of the vehicle towards the front of the vehicle; and the braking method further comprises a step of regulating the pressure force on the ground of each brake module by the control unit, so that the braking distance is as short as possible.

BRIEF DESCRIPTION OF THE DRAWINGS

The invention will be better understood upon reading the description which follows, given solely by way of example and with reference to the drawings, wherein:

FIG. 3 shows a schematic view of a railway vehicle equipped with an emergency braking device according to a second embodiment of the invention, wherein the braking element is in the retracted position; and FIG. 4 shows a schematic side view of the vehicle of FIG. 3, wherein the braking member is in the deployed position.

DETAILED DESCRIPTION

Figure 1:
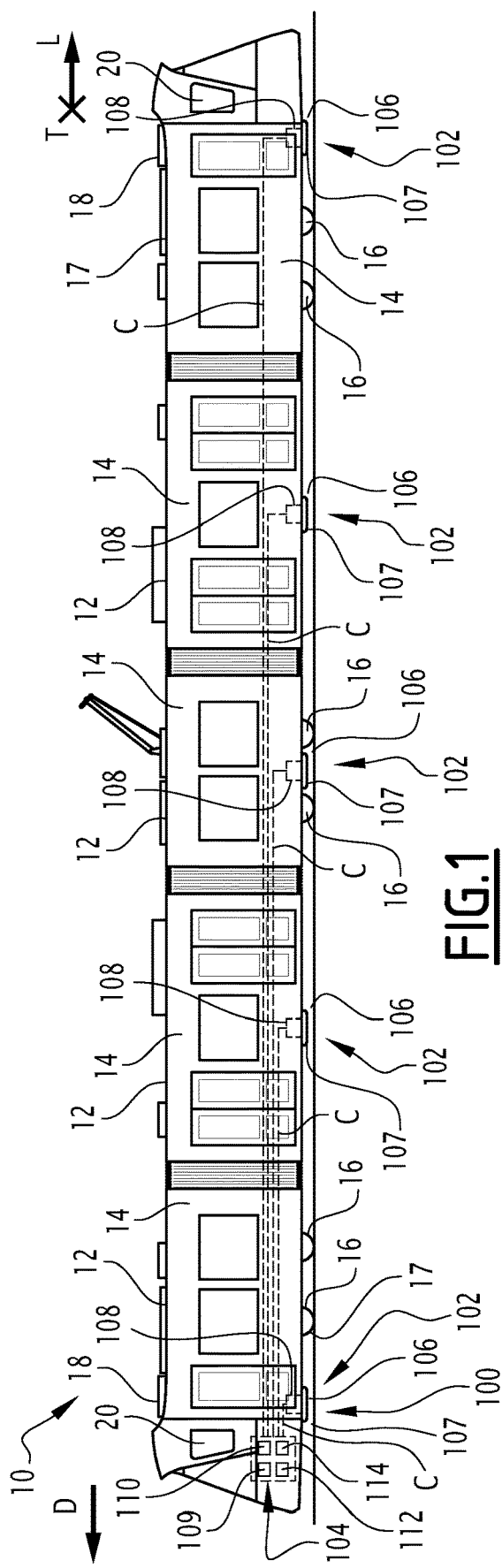
FIG. 1 shows a schematic side view of a railway vehicle equipped with an emergency braking device according to a first embodiment of the invention, wherein the braking element is in the retracted position.
Figure 2:
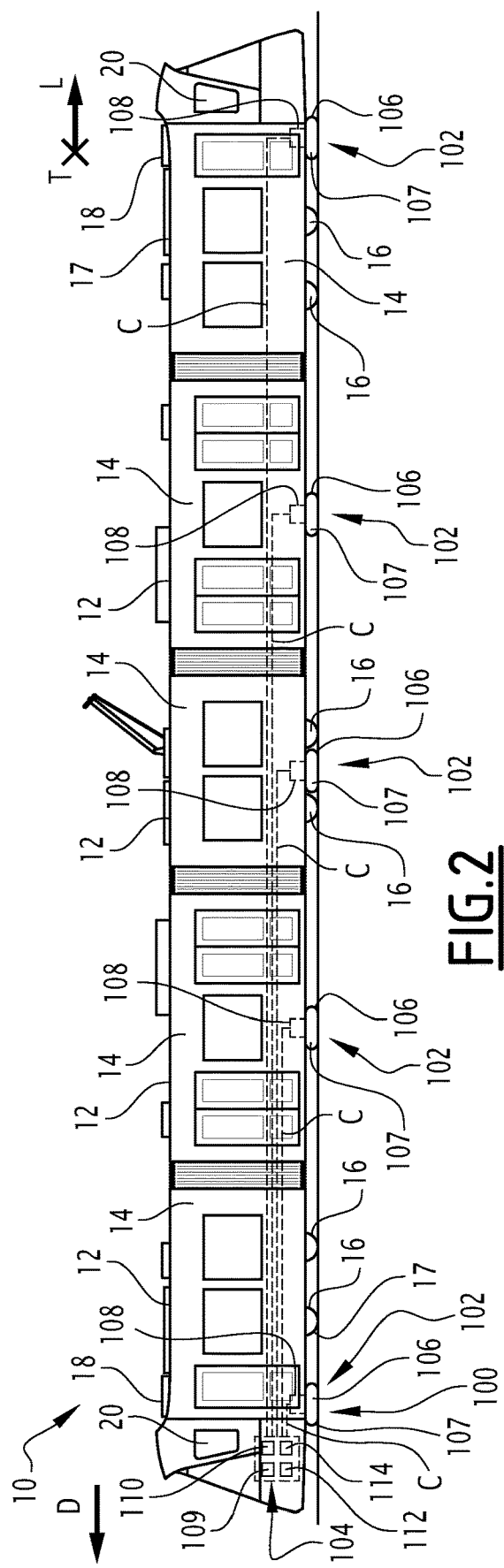
FIG. 2 shows a schematic view of the vehicle of FIG. 1, wherein the braking member is in the deployed position.

FIGS. 1 and 2 show a railway vehicle 10, for example a tram, according to a first embodiment of the invention.

The vehicle 10 is able to travel on a track, in particular a railway track, i.e. formed by rails on which the vehicle 10 is arranged, and that defines the trajectory to be followed by the vehicle 10.

The railway vehicle 10 comprises a plurality of cars 12.

Each car 12 comprises a body 14.

At least one car 12 comprises wheels 16 as known per se.

Each wheel 16 comprises an outer portion 17 intended to come into contact with the rail on which the wheel 16 is positioned. According to one embodiment, the outer portion 17 is made of metal.

The vehicle 10 comprises at least one end car 18.

In all that follows, the terms "front", "rear", "left", "right", "on" and "under" are understood to mean the direction of forward movement indicated by an arrow D in the figures. The terms "longitudinal" and "transverse" refer to the vehicle 10.

In fact, the vehicle 10 is able to travel in both directions, as the front and rear ends are identical.

Depending on the direction of travel, one of the end cars 18 forms a head car, which is the one at the front of the vehicle 10 relative to the direction of travel.

Each end car 18 has a driver's cab 20 provided at one end 22 of the end car 18.

The vehicle 10 comprises at least one normal operation braking system selected from among a hydromechanical brake, an electromagnetic brake, and an electromechanical brake. This braking system is used during normal operation to slow down and/or stop the vehicle 10.

The vehicle 10 further comprises an emergency braking device 100 that is arranged to brake the vehicle 10 when at least a portion of the vehicle 10 leaves the track on which the vehicle is traveling, i.e., when the vehicle "derails".

At least one car 12, 18 comprises the emergency braking device 100. Preferably, each car 12, 18 comprises the emergency braking device 100.

The emergency braking device 100 comprises at least one brake module 102 and a control unit 104 that is able to communicate commands to the brake module 102.

The brake module 102 is connected to the body 14 of the vehicle 10 by fastening elements, such as bolts or rivets.

Preferably, the brake module 102 is located under the corresponding car 12, 18.

The brake module 102 comprises a contact element 106 of which at least one portion 107 is intended to be in contact with the ground at the time of braking.

The portion 107 of the contact element 106 that is intended to be in contact with the ground is made of a material that is capable of maximizing the force of the pressure on the ground during braking whatever the type of ground and whatever the weather conditions.

By "maximizing the force of the pressure", is meant that the friction forces between the portion 107 and the ground are increased and significant, for example with respect to the friction forces between a metal element and the ground. Typically, the friction force generated between the portion 107 and the ground is between 5 tons and 15 tons.

For example, the portion 107 that is intended to be in contact with the ground may be made of rubber, or of composite materials loaded with metal or ceramic particles.

The contact element 106 may be adapted to the type of ground on which the track is laid in order to ensure emergency braking off the track. For example, the contact element 106 may be designed for a ground of soft material such as earth, or a ground of hard material such as concrete, wherein the structure of the portion 107 is thus designed to maximize adhesion on the diversity of grounds encountered.

The contact element 106 may be moved between a retracted position in which the contact element 106 is not in contact with the ground, and a deployed position in which the contact element 106 is in contact with the ground and is designed to slow the moving railway vehicle 10 by applying a pressure force to the ground.

The brake module 102 comprises an actuator 108 that is able to deploy the contact element 106 from its retracted position to its deployed position in a controlled manner by the control unit 104.

The control unit 104 is able to communicate to the brake module 102 the command to deploy the contact element 106 to its deployed position, when at least a portion of the vehicle 10 leaves the track on which the vehicle 10 is traveling.

The control unit 104 and the brake module 102 are, for example, interconnected by the cables C.

According to the example described, the control unit 104 is manually activated. The control unit 104 comprises, for example, at least one button 109 or at least one manually-activated handle 109 located in at least one car 12, 18 of the vehicle 10, and connected to a system that is able to send at least one signal to the brake module 102 in the event of at least a portion of the vehicle 10a leaving the track. This signal comprises at least one item of information to cause the actuator 108 to deploy the contact element 106 from its retracted position to its deployed position.

In another example, the control unit 104 is automatically activated. According to this example, the control unit 104 comprises at least one track-departure sensor 109 on the track on which the vehicle 10 is traveling. The track-departure sensor is able to send at least one signal to the brake module 102 in the event of a track-departure of at least a portion of the vehicle 10. This signal comprises at least one item of activation information to the actuator 108 to deploy the contact element 106 from its retracted position to its deployed position.

According to a particular embodiment, the control unit 104 may be triggered automatically or manually.

Preferably, the control unit 104 comprises a sensor 110 measuring the longitudinal acceleration of the vehicle and a calculator 112 of the derivative of the acceleration.

The longitudinal acceleration measuring sensor 110 is, for example, a longitudinal accelerometer 110.

The control unit 104 is able to control the pressure force on the ground of the brake module with respect to the acceleration and to the derivative of the acceleration in the longitudinal direction L. This control is so designed that the braking distance is as short as possible, and the braking is the least abrupt possible.

Advantageously, each car 12, 18 comprises at least one brake module 102, while the control unit 104 is arranged to deploy each contact element 106 from the retracted position to the deployed position. Preferably, the control unit 104 is so arranged that the ground pressure force of each brake module 102 decreases from the rear of the vehicle 10 towards the front of the vehicle 10, i.e., the pressure force on the ground at the rear of the vehicle is greater than the pressure force at the head car 18 of the vehicle 10.

Thus, the distribution of the braking power is such that an accordion-like reaction of the vehicle 10 is avoided. In addition, less powerful braking at the front of the vehicle 10 helps to completely stop the vehicle 10.

Alternatively, each car 12 may comprise a control unit 104 capable of communicating commands to the associated brake module 102.

According to one embodiment, the control unit 104 further comprises a sensor 114 to measure the transverse acceleration of the vehicle 10.

The sensor 114 to measure the transverse acceleration is able to detect a shock between the vehicle 10 and an element outside the vehicle 10. Such a shock is sometimes at the origin of the track-departure of the vehicle 10. In the event of such a shock, the control unit 104 is able to send a signal to the brake module 102. This signal comprises at least one item of activation information to the actuator 108 in order to deploy the contact element 106 from its retracted position to its deployed position.

According to the embodiment shown in FIGS. 1 and 2, the contact element 106 of the brake module 102 is an airbag. The airbag may be, for example, fixed to the vehicle body 10 via a metal shoe screwed onto the structure.

In the retracted position, the airbag is deflated, and it is not in contact with the ground as shown in FIG. 1.

In the deployed position, the airbag is inflated, and it is in contact with the ground as shown in FIG. 2, and applies a pressure force to the ground that is proportional to the internal pressure of the airbag.

According to this embodiment, the actuator 108 is, for example, a pyrotechnic system comprising charges or a pressure reservoir coupled to a solenoid valve.

Preferably, in the event of a pyrotechnic system, the charges are activated in a controlled manner by the control unit 104.

The charge-activating command is also controlled by the control unit 104.

This makes it possible to control the internal pressure of the airbag and therefore the contact pressure of the airbag on the ground. The vehicle 10 is braked according to the contact pressure of the airbag on the ground. In fact, the higher the pressure, the shorter will be the braking time.

Such a pyrotechnic system has the advantage of being responsive and very fast.

FIGS. 3 and 4 show a second embodiment of the brake module 102.

According to this embodiment, the contact element 106 of the brake module 102 is a mechanical pad.

In the retracted position, the mechanical pad is folded under the body 14 of the vehicle 10, wherein it is not in contact with the ground as shown in FIG. 3.

In the deployed position, the mechanical pad is deployed, wherein it comes into contact with the ground as shown in FIG. 4 and applies a pressure force to the ground that is proportional to the contact surface of the mechanical pad with the ground.

According to this embodiment, the actuator 108 may be a connecting device connecting the mechanical pad to the body 14 of the railway vehicle 10.

The connecting device comprises, for example, a hydraulic jack or an electric jack.

According to one variant, the mechanical pad is deployed passively by over-center deployment. According to this variant, a device releases a brake shoe that falls onto the railway. The shoe is held by mechanical arms connected to the structure. As these arms are longer than the height between the ground and the structure, they are over-center deployed under the effect of the braking and weight of the tram. An angular stop ensures that the mechanical arms cannot be returned under the effect of the braking force.

Preferably, the pressure force applied by the mechanical pad on the ground is controlled by the control unit 104.

The vehicle 10 is braked according to the contact pressure of the mechanical pad with the ground.

An example of an emergency braking method for a railway vehicle 10 comprising the emergency braking device 100 described above, will now be described.

The vehicle 10 travels on a track provided for this purpose. At least a portion of the railway vehicle 10 leaves the track. The track-departure of the vehicle 10 may be caused, for example, by a collision between the vehicle 10 and an element outside the vehicle 10, for example a motor vehicle.

In the case where the control unit 104 is manually activated, the driver notes the track-departure of the vehicle 10 and activates the control unit 104.

The control unit 104 communicates commands to the brake module 102 in order to activate the actuator 108. The actuator 108 deploys the contact element 106 from its retracted position to its deployed position.

The vehicle 10 is braked.

In another example, the control unit 104 is automatically activated. The sensor of the departure from the track on which the vehicle 10 is traveling detects the track-departure of at least a portion of the vehicle 10.

The control unit 104 sends a signal to the brake module 102. This signal comprises at least one item of activation information to the actuator 108. The actuator 108 is activated and deploys the contact element 106 from its retracted position to its deployed position.

In the event of a shock between the vehicle 10 and an element outside the vehicle 10, according to the embodiment in which the control unit 104 comprises a sensor for measuring the transverse acceleration of the vehicle 10, the sensor of the transverse acceleration of the vehicle 10 detects the shock, and the control unit 104 sends a signal to the brake module 102 to deploy the contact element 106 from its retracted position to its deployed position.

The vehicle 10 is braked.

According to the embodiment in which the control unit 104 comprises a sensor for measuring the longitudinal acceleration of the vehicle 10 and a calculator of the derivative of the acceleration in the longitudinal direction, the sensor for measuring the longitudinal acceleration takes a measurement. The calculator calculates the derivative of the acceleration in the longitudinal direction L.

The control unit 104 controls the pressure force on the ground with respect to the acceleration and to the derivative of the acceleration in the longitudinal direction L. The signal sent by the control unit 104 to the brake module 102 further comprises quantitative information to regulate the pressure forces on the ground of the brake module 102. The braking distance is then as short as possible.

Thus, when the contact element 106 is an airbag, the pyrotechnic system or the pressure tank 108 is activated, causing inflation of the airbag through an increase in the internal pressure of the airbag and generating a pressure force on the ground of the airbag proportional to the internal pressure of the airbag.

The vehicle 10 is braked.

When the contact element 106 is a mechanical pad, the hydraulic or electrical cylinder is activated, causing the deployment of the pad to its deployed position in contact with the ground.

The vehicle 10 is braked.

Advantageously, each car 12 comprises at least one brake module 102. The control unit 104 preferably communicates commands selectively to each brake module 102, so that the pressure force on the ground decreases from the rear of the vehicle 10 towards the front of the vehicle 10, as previously described.

Thanks to the invention, material damage and human injury may be avoided when the vehicle leaves the track. The emergency braking device is responsive and fast, wherein the travel distance of such a railway vehicle after derailment is thus controlled.

In addition, braking intensity is adapted in real time to control the deceleration and its derivative, and an accordion-like response of the car is avoided.

The invention claimed is:

1. A railway vehicle extending in a longitudinal direction and intended to run on a railway track, comprising:
    at least one body; and
    an emergency braking device, comprising:
        at least one brake module, each brake module comprising a contact element that is intended to be in contact with the ground at the moment of braking, wherein the contact element may be moved between a retracted position in which the contact element is not in contact with the ground, and a deployed position in which the contact element is in contact with the ground and is able to slow down the railway vehicle by applying a pressure force to the ground; and
        at least one control unit that is capable of communicating commands to said at least one brake module to deploy said at least one contact element to its deployed position, when at least one portion of the railway vehicle leaves the track on which the railway vehicle is traveling, the control unit comprising:
            a sensor measuring the longitudinal acceleration of the railway vehicle; and
            a calculator of the derivative of the longitudinal acceleration, wherein the control unit is able to control the pressure force on the ground of said at least one brake module with respect to the acceleration and the derivative of the acceleration in the longitudinal direction.

2. A railway vehicle according to claim 1, wherein each said brake module further comprises an actuator that is designed to deploy said contact element of said brake module from the retracted position to the deployed position in a controlled manner by said control unit.

3. A railway vehicle according to claim 2, wherein each said contact element comprises an airbag and each said actuator comprises a pyrotechnic system comprising charges.

4. A railway vehicle according to claim 2, wherein each said contact element comprises a contact pad and each said actuator comprises a device connecting said contact pad to said at least one body.

5. A railway vehicle according to claim 1, wherein said control unit further comprises a sensor measuring the transverse acceleration of the vehicle that is designed to detect a shock between the railway vehicle and an element outside the railway vehicle.

6. A railway vehicle according to claim 1 comprising a plurality of cars, wherein each car comprises at least one of said at least one brake module, and wherein said control unit is arranged to deploy each said contact element from the retracted position to the deployed position, so that the pressure force on the ground of each said brake module decreases from the rear of the vehicle towards the front of the vehicle.

7. An emergency braking method for a railway vehicle after the vehicle leaves the track, wherein the method comprises:
    provision of the emergency braking device according to claim 1;
    detection of at least a portion of the railway vehicle leaving the track;
    activation of the control unit;
    activation of the brake module by the control unit;
    deployment of the contact element of the brake module from the retracted position to the deployed position so that the contact element comes into contact with the ground; and
    braking of the railway vehicle.

8. An emergency braking method according to claim 7, wherein the railway vehicle comprises a plurality of cars, each car comprising at least one of said at least one brake module, and wherein the pressure force on the ground decreases from the rear of the vehicle towards the front of the vehicle.

9. An emergency braking method according to claim 7, further comprising controlling the pressure force on the ground of each brake module by said control unit, so that the braking distance is as short as possible.

10. A railway vehicle intended to run on a railway track, comprising:
    a plurality of cars, wherein each car comprises at least one brake module, each brake module comprising a contact element that is intended to be in contact with the ground at the moment of braking, wherein the contact element may be moved between a retracted position in which the contact element is not in contact with the ground, and a deployed position in which the contact element is in contact with the ground and is able to slow down the railway vehicle by applying a pressure force to the ground; and
    at least one control unit that is arranged to deploy each said contact element from the retracted position to the deployed position, when at least one portion of the vehicle leaves the track on which the vehicle is traveling, so that the pressure force on the ground of each said brake module decreases from the rear of the vehicle towards the front of the vehicle.

11. A railway vehicle according to claim 10 extending in a longitudinal direction, wherein said control unit comprises:
- a sensor measuring the longitudinal acceleration of the vehicle; and
- a calculator of the derivative of the longitudinal acceleration, wherein said control unit is able to control the pressure force on the ground of each said brake module with respect to the acceleration and the derivative of the acceleration in the longitudinal direction.

12. A railway vehicle according to claim 11, wherein said brake modules further comprise actuators that are designed to deploy said contact elements from the retracted position to the deployed position in a controlled manner by said control unit.

13. A railway vehicle according to claim 12, wherein each said contact element comprises an airbag, and each said actuator comprises a pyrotechnic system comprising charges.

14. A railway vehicle according to claim 12, wherein each said contact element comprises a contact pad, and each said actuator comprises a device connecting said contact pad to the railway vehicle.

15. A railway vehicle according to claim 10, wherein said control unit further comprises a sensor measuring the transverse acceleration of the vehicle that is designed to detect a shock between the railway vehicle and an element outside the vehicle.

\* \* \* \* \*